(12) United States Patent
Ludington

(10) Patent No.: US 8,331,048 B1
(45) Date of Patent: Dec. 11, 2012

(54) METHODS OF DESIGNING LENSES HAVING SELECTED DEPTHS OF FIELD

(75) Inventor: Paul D. Ludington, Brockport, NY (US)

(73) Assignee: Bausch & Lomb Incorporated, Rochester, NY (US)

(*) Notice: Subject to any disclaimer, the term of this patent is extended or adjusted under 35 U.S.C. 154(b) by 246 days.

(21) Appl. No.: 12/641,440

(22) Filed: Dec. 18, 2009

(51) Int. Cl.
*G02B 7/00* (2006.01)
(52) U.S. Cl. ............ 359/896; 359/900; 351/159.77
(58) Field of Classification Search .......... 359/738–740, 359/894, 896, 900; 351/159.73–159.77
See application file for complete search history.

(56) References Cited

U.S. PATENT DOCUMENTS

| | | | |
|---|---|---|---|
| 3,902,792 A * | 9/1975 | Plummer | 359/718 |
| 4,199,231 A | 4/1980 | Evans | |
| 4,373,225 A | 2/1983 | Eckardstein et al. | |
| 4,504,982 A | 3/1985 | Burk | |
| 4,525,043 A | 6/1985 | Bronstein | |
| 4,640,595 A | 2/1987 | Volk | |
| 4,642,112 A | 2/1987 | Freeman | |
| 4,752,123 A | 6/1988 | Blaker | |
| 4,769,033 A | 9/1988 | Nordan | |
| 4,981,342 A | 1/1991 | Fiala | |
| 5,000,676 A | 3/1991 | Fiala | |
| 5,019,098 A | 5/1991 | Mercier | |
| 5,044,742 A | 9/1991 | Cohen | |
| 5,073,021 A | 12/1991 | Marron | |
| 5,142,411 A | 8/1992 | Fiala | |
| 5,161,964 A | 11/1992 | Frigiere et al. | |
| 5,198,844 A | 3/1993 | Roffman et al. | |
| 5,245,366 A | 9/1993 | Svochak | |
| 5,260,727 A | 11/1993 | Oksman et al. | |
| 5,349,396 A | 9/1994 | Roffman et al. | |
| 5,410,375 A | 4/1995 | Fiala | |
| 5,436,678 A | 7/1995 | Carroll | |
| 5,485,228 A | 1/1996 | Roffman et al. | |
| 5,517,260 A | 5/1996 | Glady et al. | |
| 5,574,518 A | 11/1996 | Mercure | |
| 5,674,282 A | 10/1997 | Cumming | |
| 5,684,560 A | 11/1997 | Roffman et al. | |

(Continued)

FOREIGN PATENT DOCUMENTS

EP   0503111 A1   9/1992

(Continued)

OTHER PUBLICATIONS

Zalevsky, etal, "All-optical axial super resolving imaging using a low-frequency binary-phase mask," Optics Express, vol. 14, No. 7, Apr. 3, 2006, pp. 2631-2643.

(Continued)

*Primary Examiner* — Darryl J Collins
(74) *Attorney, Agent, or Firm* — Jeffery B. Powers

(57) ABSTRACT

A method of designing a lens having an image plane corresponding to an object located at infinity, comprising optimizing the lens by specifying quantities of light to pass through each of a plurality of the apertures. A method of designing a lens, comprising defining a plurality of objects each at a corresponding object location, at least one of the objects being a virtual object of the lens, and optimizing the lens by specifying for each of the objects a quantity of light to pass through a corresponding aperture disposed in an image space of the lens.

30 Claims, 1 Drawing Sheet

U.S. PATENT DOCUMENTS

| | | |
|---|---|---|
| 5,771,088 A | 6/1998 | Perrott |
| 5,796,462 A | 8/1998 | Roffman et al. |
| 5,800,532 A | 9/1998 | Lieberman |
| 5,822,091 A | 10/1998 | Baker |
| 5,847,802 A | 12/1998 | Menezes et al. |
| 5,864,378 A | 1/1999 | Portney |
| 5,929,969 A | 7/1999 | Roffman |
| 5,982,543 A | 11/1999 | Fiala |
| 6,024,447 A | 2/2000 | Portney |
| 6,045,578 A | 4/2000 | Collins et al. |
| 6,120,148 A | 9/2000 | Fiala et al. |
| 6,126,286 A | 10/2000 | Portney |
| 6,179,420 B1 | 1/2001 | Roffman et al. |
| 6,244,709 B1 | 6/2001 | Vayntraub et al. |
| 6,457,826 B1 | 10/2002 | Lett |
| 6,488,708 B2 | 12/2002 | Sarfarazi |
| 6,520,638 B1 | 2/2003 | Roffman et al. |
| 6,526,898 B1 | 3/2003 | Ganeshan |
| 6,533,416 B1 | 3/2003 | Fermigier et al. |
| 6,536,899 B1 | 3/2003 | Fiala |
| 6,537,317 B1 | 3/2003 | Steinert et al. |
| 6,547,822 B1 | 4/2003 | Lang |
| 6,576,012 B2 | 6/2003 | Lang |
| 6,609,793 B2 | 8/2003 | Norrby et al. |
| 6,709,103 B1 | 3/2004 | Roffman et al. |
| 6,802,606 B2 | 10/2004 | Roffman et al. |
| 6,824,563 B2 | 11/2004 | Lang |
| 6,899,425 B2 | 5/2005 | Roffman et al. |
| 6,923,539 B2 | 8/2005 | Simpson et al. |
| 6,957,891 B2 | 10/2005 | Fiala |
| 7,025,454 B2 | 4/2006 | Cathey |
| 7,036,931 B2 | 5/2006 | Lindacher et al. |
| 7,073,906 B1 | 7/2006 | Portney |
| 7,118,214 B2 | 10/2006 | Cox |
| 7,178,918 B2 | 2/2007 | Griffin |
| 7,260,551 B2 | 8/2007 | Phillips |
| 7,261,412 B2 | 8/2007 | Somani et al. |
| 7,365,917 B2 | 4/2008 | Zalevsky |
| 7,436,449 B2 * | 10/2008 | Mihara ............... 348/362 |
| 7,436,595 B2 | 10/2008 | Cathey |
| 7,646,549 B2 | 1/2010 | Zalevsky |
| 2002/0036833 A1 * | 3/2002 | Miyata et al. ............... 359/651 |
| 2003/0081171 A1 | 5/2003 | Griffin |
| 2003/0103187 A1 | 6/2003 | Miyamura et al. |
| 2005/0259222 A1 | 11/2005 | Kelch et al. |
| 2006/0098162 A1 | 5/2006 | Bandhauer et al. |
| 2006/0098163 A1 | 5/2006 | Bandhauer et al. |
| 2006/0116763 A1 | 6/2006 | Simpson |
| 2006/0167545 A1 | 7/2006 | Fiala et al. |
| 2006/0176572 A1 | 8/2006 | Fiala |
| 2006/0187413 A1 | 8/2006 | Applegate et al. |
| 2007/0002274 A1 | 1/2007 | Somani et al. |
| 2008/0157179 A1 | 7/2008 | Kim |
| 2009/0157179 A1 | 6/2009 | Pinto et al. |

FOREIGN PATENT DOCUMENTS

| | | |
|---|---|---|
| EP | 0742466 B1 | 7/2003 |
| EP | 1402852 A1 | 3/2004 |
| WO | WO 97/26843 A1 | 7/1997 |
| WO | WO 01/10354 A1 | 2/2001 |
| WO | WO 01/89424 A1 | 11/2001 |
| WO | WO 02/051338 A1 | 7/2002 |
| WO | WO 03/101355 A1 | 12/2003 |
| WO | WO 2004/095187 A2 | 11/2004 |
| WO | WO 2005/046527 A2 | 5/2005 |
| WO | WO 2006/014624 A2 | 2/2006 |
| WO | WO 2006/056847 A1 | 6/2006 |
| WO | 2006/100086 A1 | 9/2006 |
| WO | 2008/077006 A1 | 6/2008 |

OTHER PUBLICATIONS

Elkind, etal, "Optical transfer function shaping and depth of focus by using a phase only filter," Applied Optics, vol. 42, No. 11, Apr. 10, 2003, p. 1925.

Indebetouw and Bai, "Imaging with Fresnel zone pupil masks: extended depth of field," Applied Optics, vol. 23, No. 23, Dec. 1, 1984, p. 4299.

* cited by examiner

METHODS OF DESIGNING LENSES HAVING SELECTED DEPTHS OF FIELD

FIELD OF INVENTION

The present invention relates to methods of designing lenses, and more particularly to methods of designing lenses having extended depths of field.

BACKGROUND OF THE INVENTION

Lenses having extended depths of field are known. However, techniques for designing lenses configured to provide such depths of field are limited. Typically, the depth of focus is controlled by controlling the working f-number of the lens system. Optical systems with larger F/No's will have larger depths of focus. Optical design software, such as Zemax available from ZEMAX® Development Corporation, Bellevue, Wash. or Code V available from Optical Research Associate, Pasadena, Calif., provides features that are known to be useful in the design of lenses having extended depths of field. For example, a merit function specifying a lens's target modulation transfer function (MTF) at multiple locations along the lens's optical axis and proximate to the image plane (i.e., along a distance corresponding to the lens's depth of field) can be used to optimize the lens's optical parameters (e.g., radii of curvature, index of refraction, optical surface aspheric terms and thicknesses) to achieve a modest extended depth of field. However, such features have been found to have limited usefulness for designing lenses having extended depths of field, particularly when control of a geometrical optics quality of the lens (e.g., caustic) is desired such as when designing lenses that are relatively highly aberrated.

SUMMARY

Aspects of the present invention are directed to methods of designing lenses in which multiple objects are specified and a quantity of light (e.g., an encircled energy) is specified for each object at one or more locations in the image space of the lens. Other aspects of the present invention are directed to a method of designing a lens in which a quantity of light is specified at a plurality of locations in image space. It will be understood that unlike an MTF, which typically is a diffraction-based performance metric, a specification of a quantity of light as set forth above facilitates a geometric-based specification of lens performance.

An aspect of the invention is directed to a method of designing a lens having an image plane corresponding to an object located at infinity, comprising optimizing the lens by specifying quantities of light to pass through each of a plurality of apertures.

Another aspect of the invention is directed to a method of designing a lens, comprising defining a plurality of objects each at a corresponding object location, at least one of the objects being a virtual object of the lens, and optimizing the lens by specifying for each of the objects a quantity of light to pass through a corresponding aperture disposed in an image space of the lens.

The term "lens" as used herein refers to an optical system comprising one or more optical elements.

The term "virtual object" as used herein refers to an object in which the bundle of light rays that emanate from the object and strike the entrance pupil of the lens are converging. For example, if light is assumed to travel from left to right (i.e. object space to the left of the lens and image space to the right of the lens), the bundle of rays from a virtual object appear to emanate from the right of the lens (i.e., image space).

BRIEF DESCRIPTION OF THE DRAWINGS

Illustrative, non-limiting embodiments of the present invention will be described by way of example with reference to the accompanying drawings, in which the same reference number is used to designate the same or similar components in different figures, and in which.

DETAILED DESCRIPTION

Figure 1:
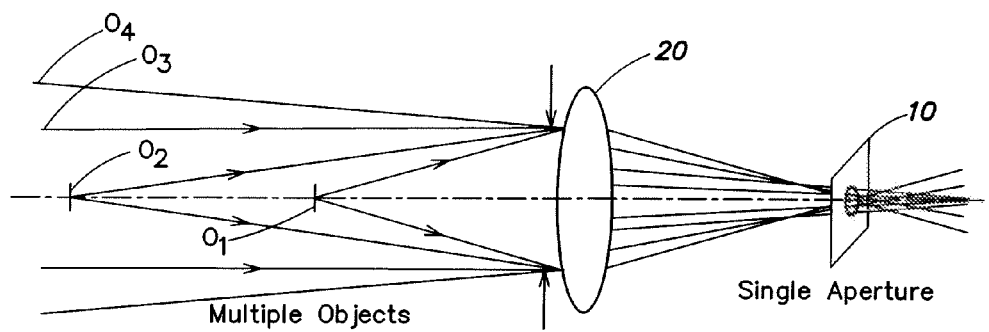
FIG. 1 is an illustration of an optical configuration schematically illustrating implementation an example of a method of designing a lens according to aspects of the present invention.

FIG. 1 is an illustration of an optical configuration schematically illustrating implementation of an example of a method of designing a lens according to aspects of the present invention. As illustrated, a plurality of object locations ($O_1$, $O_2$, $O_3$, $O_4$) is defined and an aperture 10 is disposed in an image space of the lens 20. At least one of the objects is a virtual object $O_4$. According to aspects of the invention, the lens is optimized by specifying a quantity of light to pass through the aperture for each of the object locations. For example, the optimization may be performed using a merit function specifying a quantity of light to pass through the aperture for each object. Although a quantity of light is specified as passing through the same aperture for each object (i.e., the same aperture corresponds to all of the objects), it will be appreciated that more than one aperture may be present and, for each object, a quantity of light may be specified to pass through a corresponding aperture.

The object locations for which the optimization is performed specify a depth of field over which the lens is to perform. In some embodiments, the objects are located in a range from beyond infinity (virtual object $O_4$) to a selected location (object $O_1$) that is nearer to the lens than infinity. While under conventional schemes the optical performance for virtual objects is not relevant, the Applicant has found such qualities relevant for designing lenses having extended depths of field. It will be understood that, although a physical aperture 10 is illustrated, any suitable technique for specifying a quantity of light within an area may be used. For example, when using design software, a software implementation of a physical aperture can be specified in a plane or a measurement technique indicating a quantity of light passing through an aperture without using a software implementation of a physical aperture may be used. Examples of measurement techniques suitable for indicating a quantity of light passing through an aperture without using a software implementation of a physical aperture include the GENC and GENF merit function operands in Zemax.

A quantity of light to pass through the aperture can be specified for each of the objects. A quantity of light can be specified, for example, by a number of rays or a calculated energy. A quantity of light passing through a given aperture may be specified for one or more wavelengths of light, or one or more bandwidths of light. For example, to design lenses for ophthalmic use, a bandwidth limited to visible wavelengths of light (e.g., 400-800 nm) may be specified. The distribution of light or the wavelengths of light may be same or different for each of the objects.

In some embodiments it may be advantageous if a distribution of light to pass through the aperture is specified for each of the objects (i.e., the quantity corresponding to a portion of the distribution). A distribution of light can be specified by a distribution of rays or a distribution of energy as a function of a radius R (i.e., a distance from the optical axis of the lens). Any suitable technique for specifying such a distribution of light may be used. For example, a plurality of concentric GENC or GENF merit function operands (each specifying a quantity of light though an aperture of a unique radius) may be used. A distribution of light passing through a given aperture may be specified for one or more wavelengths of light, or one or more bandwidths of light. For example, to design lenses for ophthalmic use, a bandwidth limited to visible wavelengths of light (e.g., 400-800 nm) may be specified. The distribution of light or the wavelengths of light may be same or different for each of the objects.

Although aperture 10 is illustrated as circular, in some embodiments, it may be advantageous that the aperture be non-circular. Additionally, although the aperture is shown as being on the optical axis (on-axis), an aperture may be off the optical axis (e.g., to effect an amount of coma). Also, although the objects are illustrated as being on-axis, one or more of the objects may be off-axis. Although one aperture is shown, more than one aperture may be used.

In some embodiments, it is advantageous that the lens is designed such that the caustic for a real object corresponds to a better image quality than the caustic for one or more virtual objects. It will be appreciated that such a technique may be used to design an ophthalmic lens and thereby achieve an increase in the light that is usable for vision.

In some implementations, it is advantageous to attain an initial lens configuration before performing an optimization to achieve a lens having an extended depth of field. For example, the initial configuration may be configured to attain desired first-order optical characteristics (e.g., focal length) using thicknesses of the lens and curvatures of the lens surfaces as variables. Subsequently, to achieve a suitable depth of field using an aperture in image space as described above, higher-order optical surface specifications may be used as variables. For example, a lens including at least one aspheric (e.g., a conic) surface as set forth in the following equation may be used.

$$z_{conic}(r) = \frac{cr^2}{1 + \sqrt{1 - (1+k)c^2 r^2}}$$

where c is the curvature of said surface, k is the conic constant of said surface, r is a radial coordinate, and z is the sag of the surface.

For example, when using such an aspheric surface, the first order characteristics may be set using curvature c as a variable and, in a subsequent step, depth of field characteristics are achieved using conic constant k as a variable.

In another example, a lens including at least one aspheric surface as set forth in the following example may be used.

$$z_{even}(r) = z_{conic}(r) + \alpha_1 r^2 + \alpha_2 r^4 + \alpha_3 r^6 + \alpha_4 r^8 + \alpha_5 r^{10} + \alpha_6 r^{12} + \ldots$$

where $z_{conic}$ was set forth above and the $\alpha_i$ terms correspond to even aspheric terms.

When using a surface as described by $z_{even}$, the first order characteristics may be set using curvature c as a variable and, in a subsequent step, depth of field characteristics are achieved using conic constant k and even aspheric terms $\alpha$ as variables. Although even aspheric terms are shown, it will be appreciated that even aspheric and/or odd aspheric terms may be used. Alternatively, any other suitable optical surface description may be used (e.g., spline or Zernike) to identify variable for lens optimization.

Another aspect of the invention is directed to a processor programmed to perform a lens optimization according to the methods described above.

Figure 2:
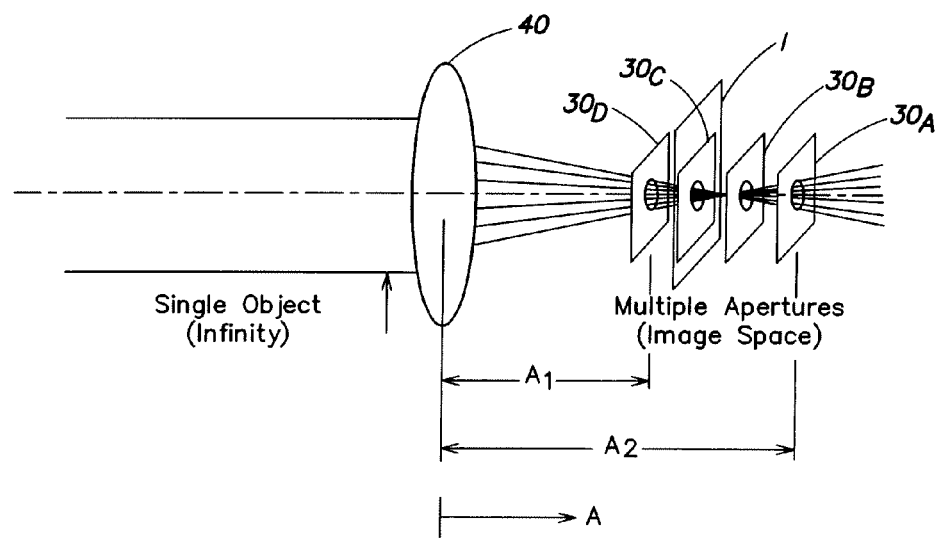
FIG. 2 is an illustration of an optical configuration schematically illustrating implementation of another example of a method for designing a lens according to aspects of the present invention.

FIG. 2 is a schematic illustration of an optical configuration for implementing another example of a method for designing a lens 40 according to aspects of the present invention. The lens has an image plane I corresponding to an object located at infinity. The configuration includes a plurality of apertures $30_A$-$30_D$. Although the rays that are traced through the apertures in FIG. 1 are illustrated as originating from an object located at infinity, the object may be located at any suitable location.

In some embodiments, at least one of the apertures (e.g., aperture $30_A$) is located closer to the lens 40 than the image plane I. It will be appreciated that any aperture closer to the lens than image plane I corresponds to a plane of an image of a virtual object. As stated above, while under conventional schemes the optical performance for virtual objects is not relevant, the Applicant has found such qualities relevant for designing lenses having extended depths of field. In particular, according to aspects of the present invention, a lens is optimized by specifying quantities of light to pass through each of the plurality of the apertures $30_A$-$30_D$, including the at least one apertures that is located closer to the lens than the image plane. Although in the illustrated embodiment there are four apertures, any suitable number of apertures may be used. In some embodiments, a distribution of light to pass through one or more or all of the apertures may be specified. Typically, the apertures will be disposed adjacent to one another such that no optical element is disposed between the apertures.

Aperture separation in image space can be specified by indicating a corresponding range of object locations. For example, the location of aperture $30_D$ (i.e., the aperture nearest to lens 20) may correspond to the image location of a −0.25 diopter object location, and aperture $30_A$ (i.e., the aperture farthest from lens 20) may correspond to the image location of a +1 diopter object location (where the diopter values are measured relative to an object at infinity). In some embodiments of the present invention, the apertures span a at least a range from a near aperture location ($A_1$) corresponding to an object location of one of −0.1, −0.25, −0.5, −0.75, and −1.0 (in diopters) to a far aperture location ($A_2$) corresponding to an object location of one of +0.1, +0.25, +0.5, +0.75, +1.0, +2.0, +3.0, +4.0 and 5.0 (in diopters) (where the diopter values are measured relative to an object at infinity). For example, in some embodiments, the apertures span a range in image space corresponding to object locations of at least $-0.1 \leq A \leq +0.1$ (diopters). In other embodiments, the apertures span a range in image space corresponding to object locations of at least $-0.5 \leq A \leq 1.0$ (diopters); and in other embodiments, the apertures span a range in image space corresponding to object locations of at least $-1.0 \leq A \leq +5.0$ (diopters). In addition to the above ranges, it is also advantageous that the apertures span a range in image space corresponding to object locations of no more than $-10.0 \leq A \leq +10.0$ (diopters). It will be appreciated that the actual range in image space corresponding to a given range of object locations is dependent at least in part on the focal length of lens 20.

It will be understood that, although physical apertures are illustrated, when using design software, a software implementation of a physical aperture can be used to specify an area through which the quantity (or distribution) of light passes; however, as an alternative, a measurement techniques indicating a quantity (or distribution) of light passing through an area without using a software implementation of a physical aperture may be used. It will be appreciated that, when using a technique where an implementation of a physical aperture is not used, the area over which the measurement is made specifies an "aperture" as the term is used herein.

According to aspects of the present invention, rays of light are traced through each of the apertures 30 consecutively. Although the illustrated apertures are shown as circular, in some embodiments, it may be appropriate that the apertures be non-circular. Additionally, although the illustrated apertures are illustrated as being on-axis, one or more of the apertures may be off-axis (e.g., to effect an amount of coma).

In some implementations, it is advantageous to attain an initial lens configuration before performing an optimization to achieve an extended depth of field. For example, as described above, the initial configuration may be configured to attain desired first-order optical characteristics (e.g., focal length) using thicknesses and curvatures as variables. Subsequently, to achieve a suitable depth of focus using apertures in image space as described above, higher order surfaces specifications may be used. For example, a lens including at least one aspheric surface as set forth in the equations above may be used.

As stated above with reference to FIG. 1: a quantity of light to pass through the aperture can be specified for each of the objects; a quantity of light can be specified, for example, by a number of rays or a calculated energy; a quantity of light passing through a given aperture may be specified for one or more wavelengths of light, or one or more bandwidths of light; for example, to design lenses for ophthalmic use, a bandwidth limited to visible wavelengths of light (e.g., 400-800 nm) may be specified; and the distribution of light or the wavelengths of light may be same or different for each of the objects. Also, an optimization may be achieved using surfaces and variables as described above with reference to FIG. 1.

Another aspect of the invention is directed to a processor programmed to perform a lens optimization according to the methods described above.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. A method of designing a lens having an image plane corresponding to an object located at infinity, comprising:
   specifying a plurality of object locations and a plurality of aperture locations, the aperture locations being disposed proximate image locations of the lens corresponding to the object locations; and
   optimizing the lens by specifying quantities of light to pass through each the plurality of apertures.

2. The method of claim 1, wherein the step of optimizing comprises specifying a corresponding distribution of light to pass through each of the plurality of apertures, each of the quantities being included in a corresponding distribution.

3. The method of claim 1, wherein each of the plurality of apertures is a software implementation of a physical aperture.

4. The method of claim 1, wherein the quantities of light are specified by a number rays.

5. The method of claim 1, wherein the quantities of light are specified by a calculated energy.

6. The method of claim 1, wherein the quantities of light are specified for a single wavelength of light.

7. The method of claim 1, wherein the quantities of light are specified for bandwidth of light.

8. The method of claim 7, wherein the bandwidth of light is limited to visible wavelengths.

9. The method of claim 1, wherein the at least one of the plurality of apertures is non-circular.

10. The method of claim 1, wherein at least one of the plurality of apertures is disposed off-axis with respect to the lens.

11. The method of claim 1, wherein the step of optimizing is achieved using, as variables, higher-order surface specifications of the lens.

12. The method of claim 1, wherein at least one of the plurality of apertures is located closer to the lens than the image plane.

13. The method of claim 1, wherein rays of the light pass through the plurality of apertures consecutively.

14. The method of claim 1, wherein the apertures span a range in image space corresponding to object locations of at least $-0.1 \leq A \leq +0.1$ (diopters).

15. The method of claim 1, wherein the apertures span a range in image space corresponding to object locations of at least $-0.5 \leq A \leq 1.0$ (diopters).

16. The method of claim 1, wherein the apertures span a range in image space corresponding to object locations of at least $0.0 \leq A \leq 1.0$ (diopters).

17. The method of claim 14, wherein the apertures span a range in image space corresponding to object locations of no more than $-10.0 \leq A \leq 10.0$ (diopters).

18. A method of designing a lens, comprising:
   defining a plurality of objects each at a corresponding object location, at least one of the objects being a virtual object of the lens; and
   optimizing the lens by specifying for each of the objects a quantity of light to pass through a corresponding aperture disposed in an image space of the lens.

19. The method of claim 18, wherein the step of optimizing comprises, for at least one of the objects, specifying a distribution of light to pass through the at least one object's corresponding aperture, the quantity of light for said object being included in the distribution.

20. The method of claim 18, wherein the quantities of light are specified by a number rays.

21. The method of claim 18, wherein the quantities of light are specified by a calculated energy.

22. The method of claim 18, wherein the quantities of light are specified for a single wavelength of light.

23. The method of claim 18, wherein the quantities of light are specified for a bandwidth of light.

24. The method of claim 23, wherein the bandwidth of light is limited to visible wavelengths.

25. The method of claim 18 wherein, for at least one of the objects, the corresponding aperture is non-circular.

26. The method of claim 18, wherein at least one of the objects is disposed off-axis with respect to the lens.

27. The method of claim 18, wherein the step of optimizing is achieved using as variables higher-order surface specifications of the lens.

28. The method of claim 18, wherein a single aperture corresponds to each of the objects.

29. A method of designing a lens having an image plane corresponding to an object located at infinity, comprising:
optimizing the lens by specifying quantities of light to pass through each of a plurality of apertures, wherein at least one of the plurality of apertures is disposed off-axis with respect to the lens.

30. A method of designing a lens having an image plane corresponding to an object located at infinity, comprising:
optimizing the lens by specifying quantities of light to pass through each of a plurality of apertures, wherein the apertures span a range in image space corresponding to object locations of at least $-0.1 \leqq A \leqq +0.1$ (diopters).

* * * * *